Patented Aug. 31, 1948

2,448,185

UNITED STATES PATENT OFFICE 2,448,185

VITAMIN EXTRACTION FROM SUNFLOWER SEED

Ezra Levin, Champaign, Ill.

No Drawing. Original application October 27, 1944, Serial No. 560,719. Divided and this application May 17, 1945, Serial No. 594,362

2 Claims. (Cl. 167—81)

1

This application is a division of my copending application 560,719 filed October 27, 1944, now abandoned.

This invention relates to the processing of sunflower seeds to obtain the several valuable factors therein in a stable condition for different uses.

It is the obect of the present invention to treat sunflower seeds or analogous material from the sunflower family in the class of dicotyledonous herbs in a gentle manner, that is, at comparatively low temperatures, in order to preserve all the valuable constituents therein without any deterioration of such constituents in the course of processing, and to enhance the stability of the resulting products prior to their ultimate use.

The invention proceeds upon the principle that natural plant products, such as sunflower seeds, may be utilized with maximum efficiency to obtain the constituents thereof in a form to render them fit for human consumption if particular care is taken in the course of the processing of such seeds to preserve the vitamin, mineral, protein, antioxidant and other biochemical values therein as they occur in the natural state prior to processing. According to the invention, this objective is attained by the solvent extraction of the natural oils from the sunflower seed at comparatively low temperatures so that the destructive effects which are normally encountered in processing steps at high temperatures do not take place.

It is a further object of the invention to provide a vitamin concentrate from defatted sunflower seed meal having a high potency of vitamin B complex, including thiamine, riboflavin and niacin.

Other objects and purposes will appear from the detailed description of the invention following hereinafter.

Sunflower seeds which heretofore have been used primarily for animal feed purposes, contain many valuable biochemical factors which may be won by suitable processing to adapt these seeds as a food for human consumption. These seeds contain high percentages of oil and protein. The natural seeds have been assayed to contain approximately 50% of oil and the assays have shown that the defatted meal derived from these kernels contains about 53% of protein. The protein constituent is heat sensitive and aside from this factor, the delicate flavor in the sunflower seed, which is of good taste, is likewise subject to deterioration at high temperatures which are ordinarily employed in conventional methods of

2 oil removal and treatment. Thus, the defatted sunflower seed meal, the oil extracted therefrom, as well as the pleasing flavor are preserved intact if the separation of the constituents of the sunflower is executed at comparatively low temperatures, that is, at temperatures not exceeding 75° C. This principle of the use of low temperatures in the derivation of the defatted meal of the sunflower seed to preserve the protein values therein is contrary to the practice in the handling of the proteins from soybeans and other leguminous seeds, in which case high temperatures improve and promote the protein values. In the case of the sunflower seeds high temperatures act to degrade or denature the protein content; such loss in protein value is avoided by the use of the comparatively low temperatures at which the solvent extraction and separation of the oil and solids, as well as the other treating steps, are executed.

The first step in the treatment of the sunflower seeds to obtain any of the desired products therefrom, involves the removal of the hulls from the seeds, which can be done by any suitable machinery known in the art for that purpose. The de-hulled sunflower seeds are then run through a set of rollers to partially crush the seeds, and this step is executed at a low degree of pressure so that the temperature of the seeds is not raised to any material degree. The oil contained in the de-hulled and rolled sunflower seeds is then extracted with a suitable organic solvent such as ethylene dichloride, hexane, petroleum ether, etc., at low temperature which may be room temperature or slightly higher, and the last traces of solvent are removed from the meal by the use of steam and a high vacuum at a temperature not exceeding 75° C.

The stable sunflower seed meal can stand for long periods of time without deterioration. It may also be used as a starting product for other valuable materials and concentrates. For example, an albumin-like protein material, having valuable foaming and coagulating characteristics, may be prepared from the water soluble fraction of the defatted sunflower meal in the following manner, which process is inoperative unless the meal is defatted.

The defatted meal in accordance with the present invention is soaked in water, in the proportion of approximately 16 parts of meal to 100 parts of water, for a period of from 30 minutes to 2 hours, with occasional stirring. The solid material is then separated by centrifuging. If desired, this solid material may be again soaked with an additional portion of water from 30 minutes to 2 hours, and after centrifuging this liquid may be combined with the first liquid extract to further increase the yield of the water soluble protein. The water soluble proteins may be derived in a solid form from the aqueous extract by evaporating the latter to dryness at a temperature no greater than 75° C. by the use of a vacuum drier or by resorting to spray drying or evaporating in shallow pans. The solid albumin-like protein obtained by this process amounts to 1% to 2% of the defatted sunflower meal.

The albumin-like protein is an effective coagulating agent which is useful in physical and chemical separation processes of all types because it possesses great coagulating power. Thus, when a water solution of this protein is heated to a temperature above 94° C. for a few minutes the protein coagulates and clumps together in one mass, rising to the surface of the liquid. This property is valuable because other compounds such as proteins, starches, and sugars may be removed from solution by this coagulating action. The liquid remaining contains water soluble vitamins such as vitamin B complex which may be recovered in solid form by evaporating the solution.

The defatted sunflower meal is initially characterized by the following analysis:

| Dry matter pct. | Ether extract pct. | Crude protein pct. | Ash pct. | Crude fiber pct. | N-free extract pct. | Gross energy cals./gm. |
|---|---|---|---|---|---|---|
| 95.41 | 4.48 | 52.83 | 6.46 | 4.05 | 27.59 | 4.57 |

The defatted sunflower seed provides an excellent source for a vitamin concentrate which may be prepared in the following manner:

A portion of the meal is mixed with 5 to 10 times its weight of water which is heated to the boiling point. All of the protein material in the meal coagulates and flocculates at the top of the liquid carrying any starches and sugars with it. The coagulated material is then removed from the liquid either by filtering or centrifuging. The liquid remaining is then concentrated under vacuum at a low temperature. The final material is a dark viscous product with a slight caramel taste consisting of a very concentrated mixture of thiamine, riboflavin, niacin and other properties of the vitamin B complex together with the minerals contained in the sunflower seed. The concentrate obtained by this process is approximately 10% of the weight of the defatted sunflower meal.

Aside from the initial boiling step to effect the separation of the protein from the mixture, the other steps of the process are conducted at low temperatures and preferably in the absence of any strong light in order to preserve the vitamin content of the concentrate.

While the invention has been described with reference to particular methods of treatment and products resulting therefrom, it is, of course, not to be limited thereto, except insofar as is necessitated by the prior art and the scope of the appended claims.

I claim as my invention:

1. A process which comprises extracting oil substantially completely from comminuted sunflower seed with an organic fat solvent substantially immiscible with water, at a temperature below about 75 degrees centigrade, eliminating the last traces of solvent from the defatted seed by means of high vacuum at low temperature, then extracting the defatted seed with water at a temperature below 75 degrees centigrade, then heating the solution thus obtained at a temperature and for a time to precipitate the protein, separating the aqueous solution from the solid material thus formed, and evaporating water therefrom to produce a concentrate comprising vitamins and other water soluble components of sunflower seed.

2. The process of claim 1 wherein the solvent is ethylene dichloride.

EZRA LEVIN.

REFERENCES CITED

The following references are of record in the file of this patent:

UNITED STATES PATENTS

| Number | Name | Date |
|---|---|---|
| 1,913,515 | Schmitt | June 13, 1933 |
| 2,229,684 | Supplee et al. | Jan. 28, 1941 |
| 2,314,282 | Levin | Mar. 16, 1943 |
| 2,369,775 | Colman | Feb. 20, 1945 |

OTHER REFERENCES

Rosenberg: Chemistry and Physiology of the Vitamins (1942), page 100.

Callegari: Chemical Abstracts, volume 34, page 477 (1940).

Callegari: Bolletino Societa Italiana di Biologia Sperimentale, vol. 14 (1939), pages 484, 485 and 486.